Jan. 22, 1935.  W. H. B. LAVARACK  1,989,043
CONNECTER
Filed Nov. 15, 1930
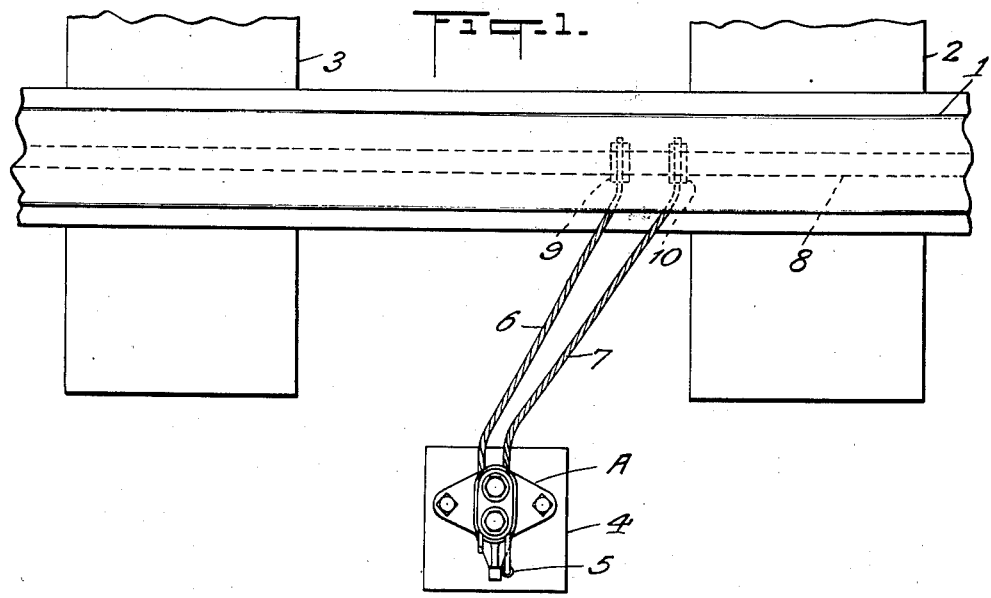
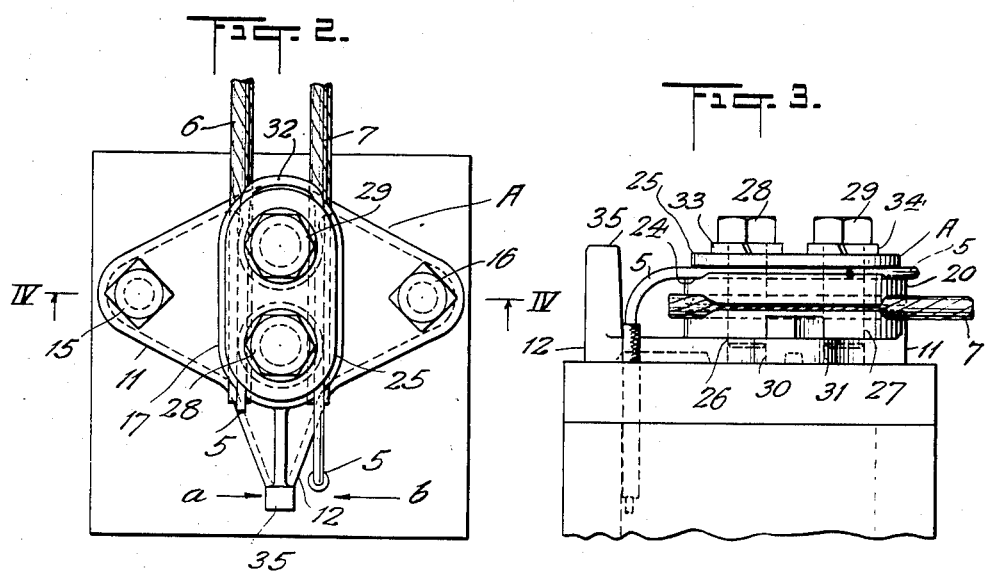
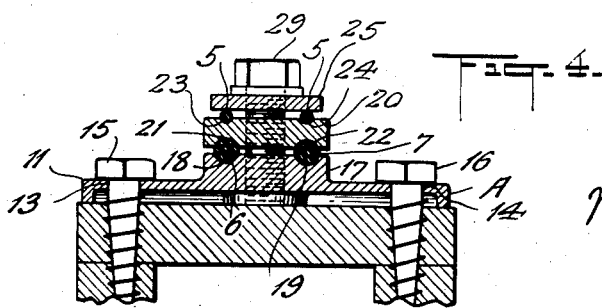
INVENTOR
William H. B. Lavarack
BY
Lyman E. Dodge
ATTORNEY Patented Jan. 22, 1935

1,989,043

UNITED STATES PATENT OFFICE 1,989,043

CONNECTER

William H. B. Lavarack, Pine Bush, N. Y., assignor to Railroad Accessories Corporation, New York, N. Y., a corporation of New York Application November 15, 1930, Serial No. 495,880

1 Claim. (Cl. 173—263)

This invention relates to electrical conductors, particularly to the electrical connecters therefor, and more especially to those as used in railway electric signalling for track circuit purposes.

It is well known to those skilled in the art of railway signalling, that part of the track circuited trackway includes electrical conductors electrically bonded, attached, or fixed to the running rails of the railway track. It is further known, that these electrical conductors lie close to the ground and are subjected to all of the inclemencies of the weather, in addition to being exposed to various mechanical injuries caused by careless workmen laboring upon the trackway, dragging parts of rolling stock, and careless trespassing pedestrians.

Considerable thought and ingenuity have been expended in attempts to devise a thoroughly satisfactory arrangement of the electrical conductors included within the track circuited section of a railway. These attempts have led to a most thorough and complete protection of these conductors by enclosing them in conduits made of various materials and lying in or on the ground adjacent the rails, or using as an electrical conductor to the running rail, a conductor such as is well-known now by the name of "parkway cable".

A weak point in all of the attempts to successfully protect, both electrically, and mechanically, the electrical conductors running to a track rail in a railway signalling system, occurs at the place where the conductors emerge from the conduit or from the ground in the case of the parkway cable; and are attached to the running rail. At this point, the conductor generally changes from one covered with insulating material to what is known, as a bare conductor, that is, one not covered with insulating material. This change is made because it has been found more satisfactory, upon the whole, to expose at this point a bare conductor rather than one covered with insulating material. The difficulty at this point, in general, resides in the inability to make a satisfactory junction, both mechanically and electrically, between the bare exposed conductor and the conduit enclosed insulated wire. This connection must be both mechanically and electrically sound and it must be such as will successfully resist the ordinary mechanical accidents and also the deteriorating effect of the elements upon a device lying on or adjacent the ground, and the connection must further be such that it excludes the possibility of the deteriorating elemental forces and the weather getting into the conduit in case such is used and within the layers of a parkway cable if that is used.

A principal object of this invention, is the production of a means suitable for use, especially in railway signalling, as a connecting means between the exposed conductors forming part of a track circuit section and the conduit covered conductors forming part of the same section, or between a parkway cable and the same exposed conductors.

A further object of the invention, is to provide a connection of the type specified which will afford both the necessary electrical and mechanical security between the connected conductors.

A further object of the invention is to provide a connection of the type specified which either alone or in connection with auxiliary attachments may be successfully used in the large majority of different conditions encountered in practice upon the various railways.

Other objects and advantages will appear as the description of the particular physical embodiment selected to illustrate the invention progresses, and the novel features thereof will be particularly pointed out in the appended claim.

In describing the invention in detail, and the particular physical embodiments selected to illustrate the invention, reference will be had to the accompanying drawing, wherein have been illustrated particular preferred physical embodiments of the invention, and wherein like characters of reference designate like parts throughout the several views, and in which:

Figure 1 is a top plan view of a portion of railway track shown in a fragmentary manner in connection with what is known in the art as a bootleg riser or trunking, with my invention applied thereto; Fig. 2 is an enlarged top plan view of a bootleg riser or trunking with my invention applied thereto; Fig. 3 is a side elevational view of the device as shown by Fig. 2; Fig. 4 is a cross-sectional elevational view of the device, as shown in Fig. 2, on the plane indicated by the line IV—IV, viewed in the direction of the arrows at the ends of the line.

Figure 1 shows a very common and usual arrangement occuring in a railway signal structure and exhibits the application of my invention to such a situation.

Numeral 1 designates a fragment of an ordinary railway rail supported upon cross ties, as 2 and 3. 4 designates a wire conduit, commonly known as a trunking or bootleg riser. The trunking or bootleg riser 4 contains an electrical conductor 5 which must, by reason of the construction of the system, be connected to the rail 1. As shown, a structure of my invention, designated generally by A, is used to electrically connect the wire 5 with the metallic electrical connecting wires 6 and 7 which are each mechanically and electrically bonded into the web 8 of the rail by the use of, as shown in the drawing, plugs 9 and 10.

As best shown in Figs. 2, 3 and 4 the device A embodying my invention includes a metallic plate, 11. This metallic plate, in the particular form selected, is somewhat diamond shaped with an extension 12 at one angle thereof. At opposite extremities of the plate 11 orifices, as 13 and 14, are formed for the reception of bolts or lag screws 15 and 16, by which the plate may be securely fastened or secured to the top of a trunking or riser.

About midway the length of the plate 11 between the orifices 13 and 14, extending substantially entirely across the plate and formed integrally therewith, is the platform 17. This platform, as best shown in Fig. 4, and in Fig. 3, is formed with, preferably semi-circular, wire receiving grooves 18 and 19 which extend preferably the full length of the platform. These grooves are shown as semi-circular, but of course, it is not intended to exclude other and appropriate forms of grooves. These grooves would preferably be made so as to receive not quite one half of the conductor intended to be secured therein.

Applicant has provided an intermediate plate 20, best shown in Figs. 4 and 3. This intermediate plate is preferably provided upon its under surface with two grooves 21 and 22 corresponding and matching the grooves 18 and 19. It is also preferably provided upon its upper surface with two grooves 23 and 24 substantially directly above the grooves 18 and 19 as viewed in Fig. 4.

Applicant also provides a top plate 25.

The platform 17, the intermediate plate 20, and the top plate 25 are all preferably formed of metal, although applicant does not intend to exclude by such construction the use of a non-metallic top plate to take the place of plate 25. The platform 17, the intermediate plate 20 and the top plate 25 are each provided with orifices which align when the plates are placed one on top of the other and upon platform 17, as best shown in Fig. 3, in which the aligning orifices are designated 26 and 27. These orifices 26 and 27 are adapted to receive the bolts, as 28 and 29, as best shown in Fig. 3. These bolts are threaded and preferably make screw connection with the plate 11 as at 30 and 31.

In use, the conductors, as 6 and 7, are positioned in the grooves 18 and 19 and the wire 5 is positioned in the grooves 23 and 24 being first carried into and through the groove 24, as shown in Fig. 3, and then curved around as at 32, as shown in Fig. 2, and then placed in groove 23. When the conductors 6, 7 and 5 are positioned as described the bolts 28 and 29 are firmly seated so that the platform 17, the wires 6 and 7, the wire 5, the intermediate plate 20, and the top plate 25 are all firmly and securely held together. To prevent any shaking from loosening the parts, the lug nuts 33 and 34 are preferably employed.

In order to protect the wire 5 which issues from the conduit or trunking from being mechanically injured, applicant erects a protecting standard 35 upon the extension 12 of the plate 11. This standard 35, as best shown in Fig. 3, extends slightly above the upper plane of the wire 5 and closely adjacent thereto, as shown in Figs. 1 and 2. This construction prevents the wire 5 from being struck by an object moving in the direction of the arrow $a$ of Fig. 2 and furnishes a backing or buffer for the wire 5 if struck by an object moving in the direction of the arrow $b$ of Fig. 2. An object moving from above, as a foot, as will be seen by reference to Fig. 3, must be quite small in dimensions in order to fall between protecting standard 35 and top plate 25.

Applicant prefers to cover metallic plate 11, platform 17, intermediate plate 20, and top plate 25 with a weather resisting or rust preventing coating, such as tin.

The device embodying applicant's invention may be most securely attached, as by the bolts 15 and 16, to the conduit, trunking or riser carrying a conductor such as 5 which must be electrically connected to a track rail. The conductors 6 and 7 are not only most securely mechanically held, but are also most efficiently electrically connected to the metallic plate 11. The binding force of the bolts 28 and 29, the strength of the plate 11, and the connecting parts is such that if these conductors, 6 and 7, are caught by dragging rolling stock parts they will not be pulled out of the grooves 18 and 19. The conductor 5 is not only very securely held by reason of the pressure of the bolts 28 and 29, but the curved portion 32 thereof so acts that it is practically impossible to pull wire 5 from between the top plate 25 and intermediate plate 20.

If any of the conductors should become broken, no tools other than a wrench are needed to restore the system to its former state, it being merely necessary to loosen the bolts 28 and 29 remove conductors, as 6, 7, and 5, and replace by new conductors, as 6 and 7, or by new portions of the conductors, as 6 and 7, and to place new portions of wire 5 in the grooves.

Although I have particularly described one particular physical embodiment of my invention, and explained the principle and described the operation and construction thereof, nevertheless, I desire to have it understood that the form selected is merely illustrative, and does not exhaust the possible physical embodiments of the idea of means underlying my invention.

What I claim as new and desire to secure by Letters Patent of the United States, is:

An electrical conductor connecter device for use in a railway track electrical circuit system of the class which embodies a conduit having a bootleg or outlet structure with a top part situated near the track and provided with an orifice of more or less indeterminate position, and through which leads a conductor to be connected with outer exposed conductors leading from a track rail: said connecter device comprising, in combination: a substantially flat, plate-like body to be positioned and secured upon said top part of the conduit, having a part formed with spaced grooves for receiving adjustably the end portions of said conductors leading from the track rail, an intermediate plate formed with grooves matching said first grooves and with further grooves for the reception of said conductor leading from the orifice in said conduit top part, a top plate, and connecting means transfixing said plates in the space between said grooves and serving to connect said plates firmly together in mechanical and electrical union with all of said conductors; said body plate being further characterized by an integral V-shaped extension provided at its apex with a standard adapted to be positioned near said orifice of the conduit top part and to leave said orifice exposed, regardless of considerable variation in its position, said standard being positioned substantially in a vertical plane extending through said connecting means between said track conductors, so as to permit free longitudinal adjustment of their free ends and protrusion of the free end of at least one of said track conductors to a considerable extent beyond said plates, the standard being of approximately the combined height of said superimposed plates, and cooperating therewith to protect the conductor portions lying in the space between the plates and standard, the latter space being of sufficient extent to afford ample room for manipulation of all of said conductors in completing the interconnection thereof.

WILLIAM H. B. LAVARACK.